Patented Aug. 10, 1943

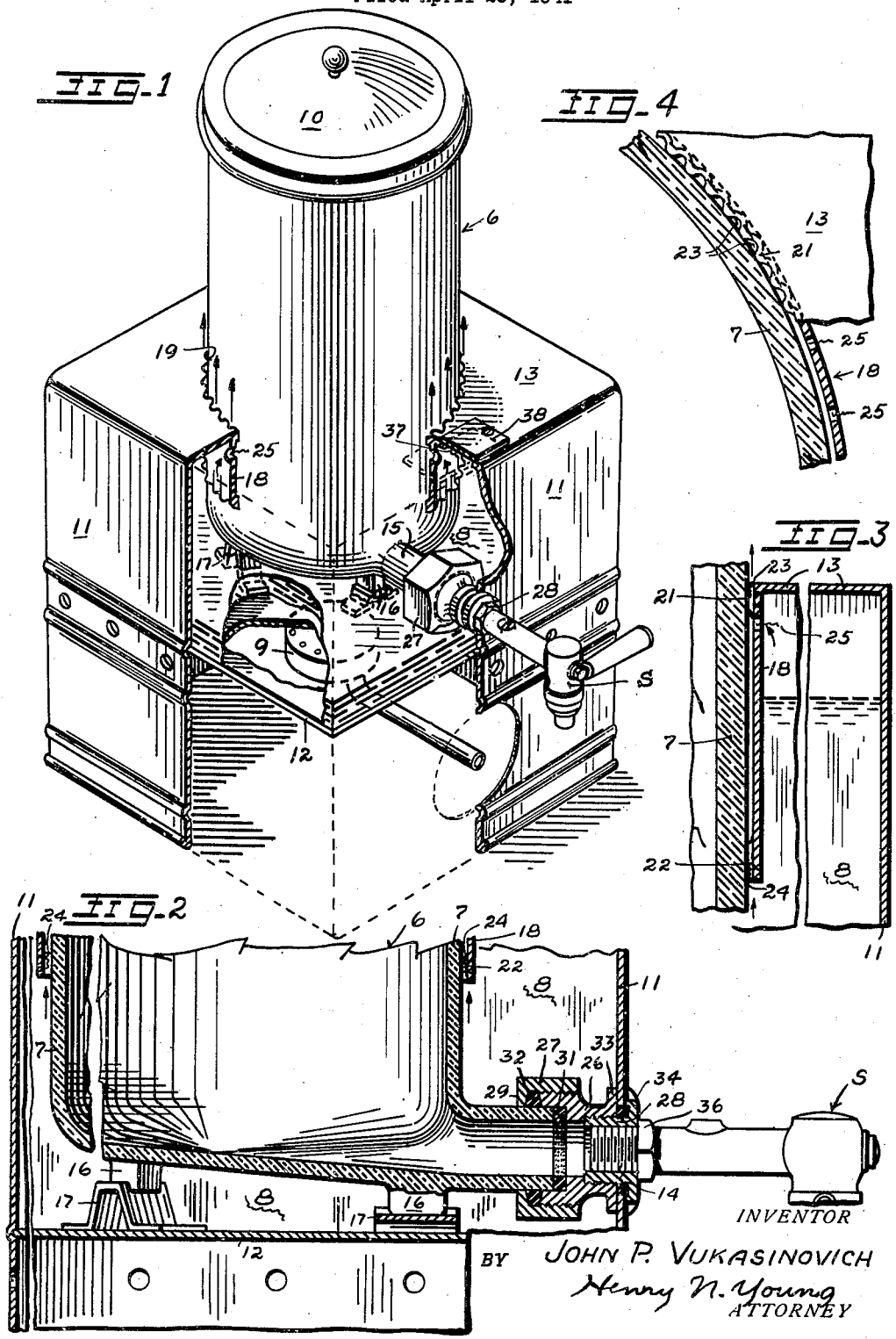

2,326,420

UNITED STATES PATENT OFFICE 2,326,420

HOT BEVERAGE DISPENSER

John P. Vukasinovich, Oakland, Calif.

Application April 23, 1941, Serial No. 389,947

3 Claims. (Cl. 53—3)

The invention relates generally to a dispenser for beverages which are to be served hot for some time after their preparation.

An object of the invention is to provide a generally improved hot-beverage storage dispenser wherein the beverage is contained in a transparent-walled and unjacketed urn and is kept hot by a water bath while a major portion of the urn is exposed to view.

Another object is to provide means for maintaining the temperature of the beverage in the urn above the critical temperature below which deleterious changes would occur in the beverage.

A further object is to provide an urn and dispensing spigot assembly in which a contact of the beverage with metals is minimized.

Yet another object is to provide an improved connection between the urn and spigot, said connection providing a releasable seal at the wall of the water bath through which it passes.

The invention possesses other objects and features of advantage, some of which, with the foregoing, will be set forth or be apparent in the following description of a typical embodiment thereof, and in the accompanying drawing, in which, Figure 1 is a perspective view of a coffee-dispensing unit embodying the features of present invention, a portion of the structure being broken away to disclose interior features thereof.

Figure 2 is an enlarged fragmentary vertical section taken at and adjacent the urn bottom in a plane including the urn axis and the discharge outlet for the unit.

Figure 3 is an enlarged fragmentary sectional elevation of a portion of the showing of Figure 1 and taken at the top portion of the water bath.

Figure 4 is a fragmentary plan view of the structural portion shown in Figure 3.

As particularly illustrated, the features of my invention have been incorporated in a unit for dispensing brewed coffee which is to be served over a period of time rather than immediately after brewing. In the present unit, the infusion of coffee is dispensed from a storage urn 6 of generally cylindrical form and having a transparent side wall 7, the urn comprising a one-piece structure of glass or a transparent plastic which may be heated and cooled without damage to it. The urn 6 is single-walled, or unjacketed, and is provided with a removable cover 10 which would preferably be insulated against the escape of heat therethrough.

Approximately the lower third of the urn is immersed in a water bath in a chamber 8 provided above a gas burner 9 or some other suitable source of heat. As particularly shown, the chamber 8 is rectangular and is defined between side walls 11, an imperforate bottom wall 12, and a top wall 13 provided with a central opening for receiving the urn 6 therethrough for its support from the bottom wall 12. The front side wall 11 has an opening 14 at which sealed connections for a dispensing spigot or faucet S are provided. Preferably, and as shown, the urn is provided with an integral discharge tube or spout 15 for connection with the spigot S through the perforation 14 of the front wall 11, with the urn bottom so formed that the spout 15 extends radially from the lowest point of the urn cavity; in this manner, a complete drainage of the urn is possible. As is a common practice, the urn portion above the urn heating means is exposed to view whereby its contents may be seen through its transparent side wall 7.

As shown, the various side walls 11 are extended downwardly below the chamber 8 to provide a hollow base beneath the water bath and in which the burner 9 is supported. For supporting the urn 6, the bottom thereof is preferably provided with three feet 16 integral with the urn bottom and extending downwardly therefrom to engage the tops of supporting elements 17 extending upwardly from the bottom 12. In this manner, the urn may be positively supported in the water bath. In the present instance, the walls 11 and top 13 provide the exterior of a unitary urn supporting and heating assembly.

A tubular sleeve or collar 18 depends from and defines the edge of the opening in the top wall 13 of the chamber 8. At top and bottom portions 21 and 22 thereof, the sleeve 18 is vertically fluted or corrugated to provide upper and lower sets of vertical passages 23 and 24 about and along the outer face of the urn side wall 7. Perforations 25 are provided through the sleeve 18 in an encircling line thereof just below the upper fluted portion 21, and the water level in the chamber 8 is preferably maintained at a point between the openings 25 and the bottom of the sleeve. The flutings or corrugations of the sleeve extend inwardly of the unfluted portion of the sleeve cylinder to closely and removably receive the urn near its bottom as a centering means for the urn in its mounted position.

It will now be noted that the passages 23 provided by the upper fluted sleeve portion 21 comprise the sole exit for steam which may be generated in the chamber 8 as a result of the heating of the water bath therein by the burner 9 or some other source of heat. The sleeve space above the water level therein is arranged to receive steam through the perforations 25 and to function as a steam manifold for distributing the generated steam to the passages 23 which direct the steam and any accompanying water vapor upwardly against and along the exposed urn side portion above the top wall 13 of the chamber in the manner of nozzles.

The described steam discharging arrangement is designed to provide a shield or screen of steam about the exposed cylinder portion for retaining the heat which would otherwise escape into the surrounding air by radiation from the liquid in the urn through the exposed portion of the urn wall 7; in other words, the temperature at any level in the coffee is maintained clear to the wall. With the present device, the temperature of the beverage is arranged to be kept above the temperature at or below which deleterious effects on the brew composition and/or taste may occur, it being noted that an undue cooling of only a portion of hot brewed coffee, or other beverages, in a container may result in the spreading of the resulting deleterious effect to the entire body of liquid.

Any water resulting from a condensation of the steam upon the exposed urn wall portion will run downwardly along the wall 7 to return through the sleeve 8 to the water in the bath. The passages 24 provided at the bottom fluted portion 22 of the sleeve 18 permit a ready flow of water to or from the steam manifold space above them and so prevent any interference of the water with the required uniform discharge of steam around the urn.

Referring to the connecitons between the urn spout 15 and the spigot S, it will be noted that the necessary connection through the opening at the front wall 11 is provided by a sleeve member 26 with which a nut member 27 and a spigot-mounting tube 28 respectively cooperate for providing sealed connections between the sleeve 26 and the spout and between the sleeve and wall. At its inner end, the member 26 is externally threaded to mount the member 27 which comprises a gland nut having an inturned flange 29 at its inner end defining a bore which closely and slidably receives the spout 15. The bore of the sleeve 26 is stepped to slidably receive the extremity of the spout in its larger portion, and the smaller bore portion provides a continuation of the spout bore when the member is mounted on the spout.

A ring 31 of soft packing is interposed between the spout end face and the annular shoulder provided between the beforementioned bore portions of the sleeve, and a sealing ring 32 is provided within the nut 27 and between the flange 29 and the inner end face of the sleeve. The sleeve 26 may be sealedly fixed on the spout 16 by telescopically engaging the sleeve and spout with the rings 31 and 32 in their proper positions and, while holding the sleeve inwardly on the spout, screwing the nut 27 up on the sleeve to compress the ring 32 and establish its frictional grip upon the spout exterior. When the spout has been first gripped by the ring 32 against movement of the engaged sleeve and nut along it, a further turning up of the nut will tend to move the sleeve inwardly on the spout to further compress the ring 31, it being noted that said ring not only provides a secondary seal between the sleeve and spout but also provides a connecting continuation of the sleeve and spout bores.

The outer end portion of the sleeve 26 provides a radial flange 33 for seating against the inner face of the wall 11 about its opening, and is internally threaded to receive a threaded inner end portion of the tubular member 28. The member 28 is provided with a radial flange 34 which is arranged to seat against the outer face of the opening in the wall 11 while the threaded portion of the member extends through said opening for threaded engagement with the sleeve 26. The flange 34 may be formed as a nut, and the screwing of the tube into the member 26 while the flanges 33 and 34 of the respective members are disposed opposite the portions of the wall 11 about the opening is arranged to sealedly clamp the wall and a sealing gasket 35 between the flanges to support the described connector assembly on the wall.

The bore of the tube 28 is threaded to receive the complementarily threaded end of the spigot body, and a lock nut 36 may be provided on said threaded spigot portion for engaging the outer flanged end of the tube 28 to secure the spigot in rotatively adjusted position. It is to be particularly noted that the present sealed connection between the wall and the urn spout permits the removal and replacement of the spigot without disturbing the connection.

A normally closed opening 37 of the chamber top 13 is provided for use in maintaining the necessary amount of water in the water bath in the chamber, said opening being covered by a displaceable cover member 38 which provides a sealed closure for the opening 37. The opening 37 may be conveniently provided above the ring nut 27 of the connector assembly to facilitate the application of a wrench to said nut for its tightening and loosening as required.

While it is generally immaterial as to how the beverage is provided in the urn 6, the present structure permits the mounting of a receptacle (not shown) on the urn in lieu of the cover 10 and having a perforated bottom and arranged to contain coffee grounds through which hot water may be poured to produce a coffee infusion directly in the urn. It will be understood that the described dispensing unit is adapted for serving other hot beverages such as tea, chocolate, bouillon, etc., as well as coffee, whereby a limitation to a dispenser for coffee is not to be implied. Also, the rectangular form of the base which includes the water bath chamber facilitates the use of two or more of the units in a bank thereof, as for the use of the units in restaurants, hospitals, etc.

From the foregoing description taken in connection with the accompanying drawing, the advantages of the construction and methods of operation will be readily understood by those skilled in the art to which the invention appertains. While I have described the features and the principle of operation of an arrangement which I now consider to be a preferred embodiment of my invention, I desire to have it understood that the showing is primarily illustrative, and that such changes may be made, when desired, as fall within the scope of the following claims.

I claim:

1. In a dispenser for hot beverages, a cylindric urn, a closed chamber providing a water bath and having a top opening for closely receiving said urn to extend into the water bath, means to heat the said water bath for the generation of steam therein, and a sleeve depending from said opening and having upper and lower portions thereof axially corrugated toward the opposed urn side to define upright passages therealong at opposite sides of a manifold space therein encircling the urn, the upper said passages comprising the sole steam outlet for the chamber, and said sleeve being provided with lateral perforations between said corrugated portions thereof.

2. In a dispenser for hot liquids, an urn, a closed chamber providing a water bath and having a top opening for closely receiving said urn to extend into the water bath, means to heat the water in said water bath for the generation of steam therein, and a sleeve depending from said opening into the water bath and having an upper portion thereof axially corrugated toward the opposed urn side to define upright passages along and peripherally about the urn and comprising the sole steam outlet for the chamber, said sleeve being provided with lateral perforations below said corrugated portion thereof and above the water level in the water bath.

3. In a dispenser for hot liquids, an urn, a closed chamber providing a water bath and having a top opening for closely receiving said urn to extend into the water bath, the edge of said opening being scalloped along its length to provide riser passages along and about the urn, means to heat the water in said water bath for the generation of steam therein, and a sleeve depending from said opening into the water bath and defining a continuous manifold space about the urn for distributing steam to said riser passages, said sleeve being provided with lateral perforations at said manifold space and above the water level in the water bath.

JOHN P. VUKASINOVICH.